United States Patent [19]

Posner

[11] Patent Number: 5,259,589
[45] Date of Patent: Nov. 9, 1993

[54] STOP FOR ROTATIONAL ACTUATORS

[76] Inventor: Hyman A. Posner, 441 Hanlan Rd., Woodbridge, Ontario, Canada

[21] Appl. No.: 940,847

[22] Filed: Sep. 4, 1992

[51] Int. Cl.⁵ .................... F16K 5/08; F16K 51/00
[52] U.S. Cl. .................................. 251/285; 257/286
[58] Field of Search ............... 251/60, 285, 286, 288

[56] References Cited

U.S. PATENT DOCUMENTS

| | | | |
|---|---|---|---|
| 1,943,865 | 1/1934 | Hennessey | 251/285 X |
| 3,552,434 | 1/1971 | Haenky | 251/286 X |
| 4,064,981 | 12/1977 | House et al. | 192/141 |
| 4,930,611 | 1/1990 | Grimm | 192/139 |
| 5,014,598 | 5/1991 | Champagne | 192/13.005 |
| 5,139,230 | 8/1992 | Lester | 251/286 X |

FOREIGN PATENT DOCUMENTS

| | | | |
|---|---|---|---|
| 0350596 | 1/1990 | European Pat. Off. | 251/285 |
| 320865 | 4/1957 | Switzerland | 251/285 |

OTHER PUBLICATIONS

Worcester Controls Series 39 Pneumatic Actuator (3 pages) Dec. 1989.

*Primary Examiner*—John Rivell
*Attorney, Agent, or Firm*—Marcelo K. Sarkis; Neil H. Hughes; Ivor M. Hughes

[57] ABSTRACT

An apparatus for limiting the rotational travel of a shaft of a valve actuator. A shaft engaging element having detents disposed therewith is connected to the shaft. A stop element is coupled to the actuator. When the shaft engaging element rotates with the shaft, the detents cooperate with the stop such that after a predetermined degree of rotational travel of the shaft the detents limit the travel of the shaft such that the resultant force balance of the shaft engaging element and thus the shaft is substantially zero.

16 Claims, 4 Drawing Sheets

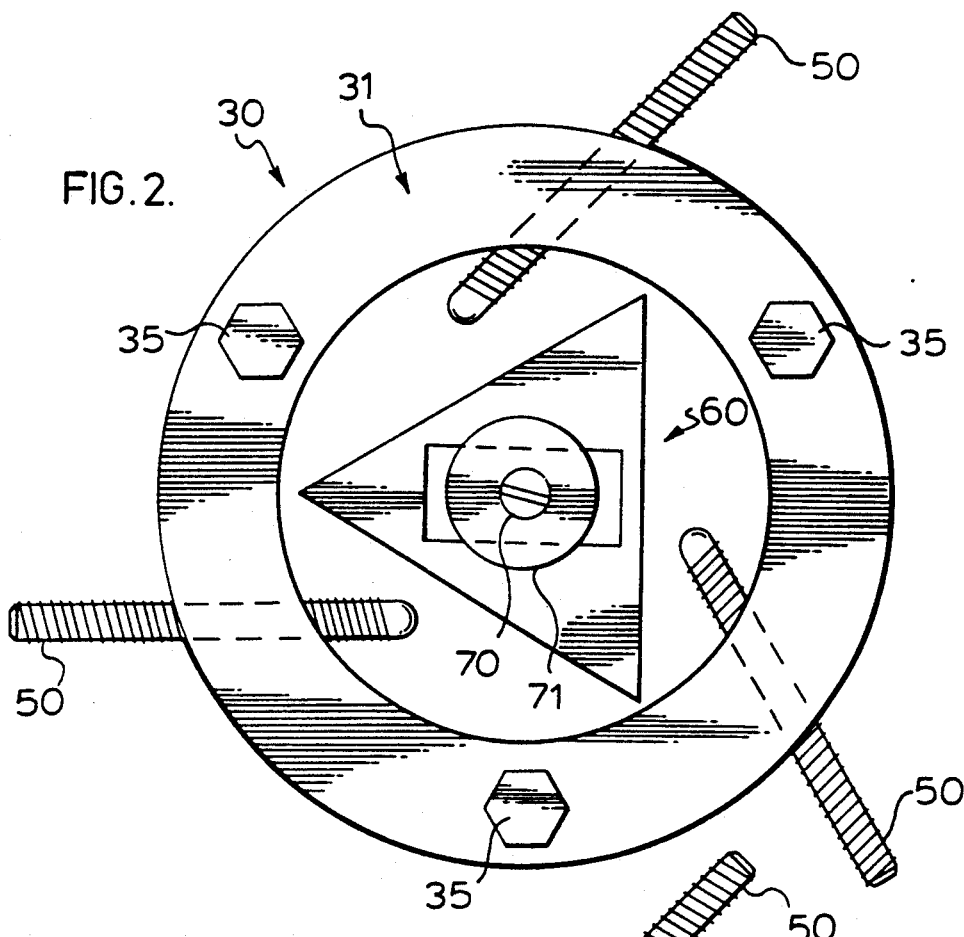
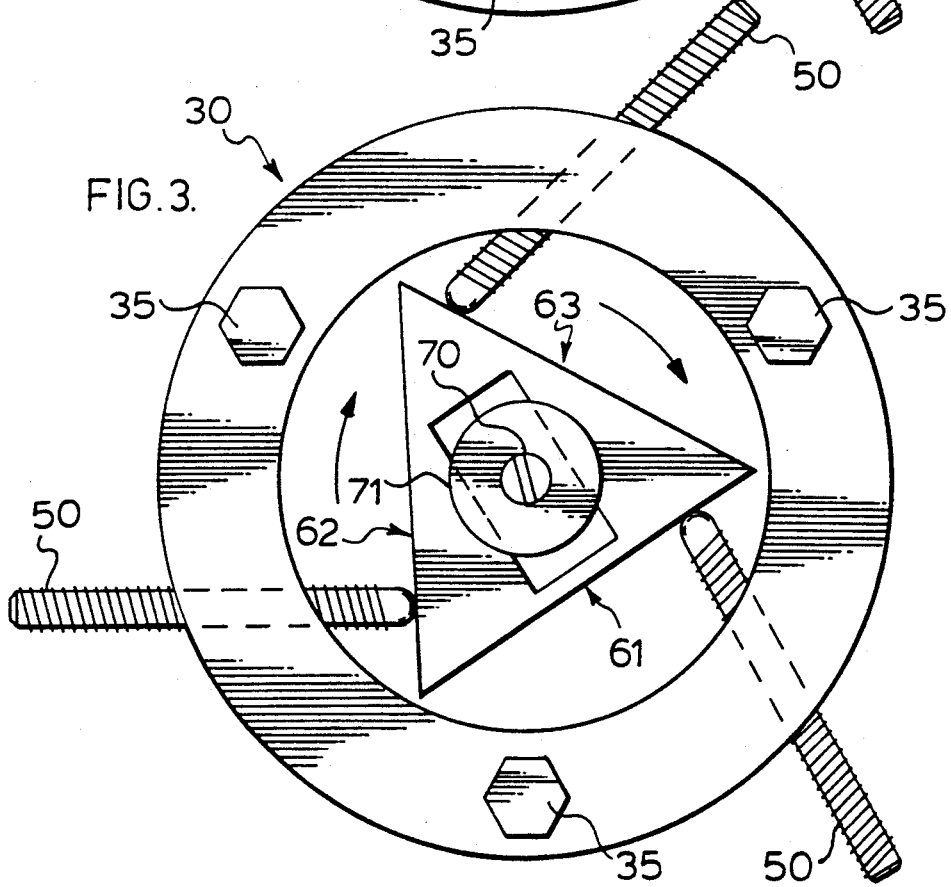

STOP FOR ROTATIONAL ACTUATORS

FIELD OF INVENTION

This invention relates to a stop assembly for limiting the degree of rotation of valve actuators or other mechanical equipment

BACKGROUND OF THE INVENTION

In the field where it is required to initiate the remote opening and closing of valves, actuators are used. In some applications, it is necessary for the valve end travel positions to be adjusted or limited. In other words it is sometimes necessary to control the degree of opening and closing of valves. In the field, the devices which limit the degree of opening and closing of valves by an actuator are called in one instance travel stops.

A typical travel stop is a paddle rotatably mounted on an exposed shaft of an actuator, which has two adjustable bolts connected to the actuator, which in turn restrict the rotational movement of the paddle in one direction by adjusting the bolt position. When the exposed shaft of the actuator rotates which in turn rotates the paddle, one side of the paddle abuts against one of the bolts. Applicant has found that this arrangement creates an unbalanced load on the exposed shaft which may in time lead to premature wear in the bearings and leakage of the seals in the actuators.

Applicant has also found that this arrangement may interfere with mounting of accessories on the actuator, such as limit switches, or the like.

Another typical design consists of a stroke adjuster connected to the ends of an actuator through the end caps, which involves the penetration of the pressure boundary in the actuator itself. This penetration could lead to potential pressure leak paths resulting in the failure of the actuator. Furthermore, applicant has found that this particular configuration cannot be easily retrofitted in the field without dismantling the actuator itself and without replacing the end caps of the actuator with end caps to conform with the stroke adjuster arrangement as well. This may become costly to the user.

It is therefore an object of the invention to provide an external rotation limiter for a valve actuator which will reduce the side loads on the shaft which in turn reduces the chance of wearing of the seals in the actuator.

It is also another object of the present invention to provide a rotation limiter for a valve actuator which can be easily retrofitted on an actuator incorporating existing bolt holes thereon, thus eliminating the need to purchase accessories to install the device.

It is yet another object of the present invention to provide a rotation limiter for a valve actuator which does not penetrate the pressure boundary of the actuator thus reducing the possibility of pressure leaks.

It is yet another object of the present invention to provide a rotation limiter for a valve actuator which will not interfere with other accessories on the valve actuator.

It is yet another object of the present invention to provide a rotation limiter for a valve actuator such that the sum of moments and forces on the shaft is substantially nil.

It is yet another object of the present invention to provide a rotation limiter for a valve actuator that is unidirectional.

It is yet another object of the present invention to provide a rotation limiter for a valve actuator that is bidirectional.

Further and other objects of the invention will become apparent from the following summary of the invention and detailed description of embodiments of the invention.

SUMMARY OF THE INVENTION

In one embodiment of the invention, there is provided an apparatus for limiting the rotational travel of a shaft of a valve actuator comprising;

shaft engaging means connected to a shaft accessible from said valve actuator so as to rotate when the accessible shaft is free to do so, mounting means coupled to said actuator, preferably proximate said shaft, said mounting means having (preferably adjustable) stop means disposed therewith, wherein when said shaft rotates said shaft engaging means cooperates with said stop means, such that after a predetermined degree of rotational travel of the shaft, said shaft engaging means in cooperation with said stop means limits the rotational travel of said shaft of said valve actuator, the resultant force balance on said shaft being substantially zero (for example there is no side load on said shaft tending to deteriorate the life of the bearings and/or seals thereof).

In another embodiment of the invention, there is provided an apparatus for limiting the rotational travel of an accessible shaft of a valve actuator comprising;

shaft engaging means, having detent means disposed therewith and connectible to a shaft accessible from said valve actuator mounting means for coupling to said actuator preferably proximate said shaft, said mounting means further comprising preferably adjustable stop means for cooperating with said detent means, wherein when said shaft engaging means rotates with said shaft, said detent means thereof cooperates with said stop means, such that after a predetermined degree of rotational travel of the shaft, said detent means of the shaft engaging means in cooperation with said stop means of said mounting means limits the rotational travel of said shaft of said valve actuator, such that the resultant force balance on said shaft engaging means and thus the shaft is substantially zero (for example there is no side load on said shaft tending to deteriorate the life of the bearings and/or the seals).

In a preferred embodiment said shaft engaging means preferably comprises at least three equidistantly spaced apart detents, which if connected from point to point, form an equilateral triangle.

In still yet another preferred embodiment said adjustable stop means preferably comprises at least three adjustable stop screws, if connected from point to point, also forming an equilateral triangle.

In yet another preferred embodiment the shaft engaging means is substantially an equilateral triangle, wherein said sides are the detent means.

In still yet another embodiment of the invention, there is provided an apparatus for limiting the rotational travel of a shaft of a valve actuator comprising;

shaft engaging means, having detent means disposed therewith, connected to a shaft accessible from said valve actuator (preferably adjustable) stop means coupled to said actuator, wherein when said shaft engaging means rotates with said shaft, said detent means cooperates with said stop means, such that after a predetermined degree of rotational travel of the shaft, said detent means in cooperation with said stop means limits the rotational travel of said shaft of said valve actuator, such that the resultant force balance on said shaft engaging means and thus the shaft is substantially zero (for example there is no substantial side load on said shaft tending to deteriorate the life of the bearing and/or the seals).

In still yet another embodiment of the invention, there is provided an apparatus for limiting the rotational travel of a shaft of a valve actuator comprising;

shaft engaging means, having detent means disposed therewith, connectible to a shaft accessible from said valve actuator adjustable stop means for coupling to said actuator, wherein when said shaft engaging means rotates with said shaft, said detent means cooperates with said stop means, such that after a predetermined degree of rotational travel of the shaft, said detent means in cooperation with said stop means limits the rotational travel of said valve actuator, such that the resultant force balance on said rotating means and thus the shaft is substantially zero (for example there is no substantial side load on said shaft tending to deteriorate the life of the bearing and/or the seals).

In another preferred embodiment of the present invention, the apparatus of the above embodiments for limiting the rotational travel of a shaft of a valve actuator limits the travel in at least one direction.

Even yet in another preferred embodiment of the present invention, the apparatus of the above embodiments for limiting the rotational travel of a shaft of a valve actuator limits the travel in two directions.

In still yet in another preferred embodiment of the present invention, the valve actuator is a quarter turn actuator.

In still yet in another preferred embodiment of the invention there is provided a travel stop for limiting the rotational travel of a valve shaft preferably in at least one direction of a actuator comprising;

a stop being substantially an equilateral triangle in shape and connectible to a shaft, accessible from said actuator, a mounting ring for mounted with said actuator having three substantially equidistantly spaced apart preferably adjustable stop screws thereon for cooperating with said stop being substantially an equilateral triangular in shape, such that after a predetermined degree of rotational travel in at least one direction of said valve shaft said triangular stop will abut against the stops screws of said mounting ring, thereby preventing the valve shaft from rotating further preferably in at least one direction, such that the resultant force balance on said stop is substantially zero and there is no side load on said shaft tending to deteriorate the life of the bearing and/or seals of said shaft.

In still yet another preferred embodiment of the present invention, there is provided a travel stop for limiting the rotational travel of a valve shaft preferably in at least one direction of an actuator comprising;

a stop being substantially an equilateral triangle in shape having three equal sides connected substantially through its centre to a shaft, accessible from said actuator, a mounting ring mounted on said actuator having three substantially equidistantly spaced apart adjustable stop screws mounted therewith for cooperating with the sides of said substantially equilateral triangular in shape stop in use, such that after a predetermined degree of rotational travel in at least one direction of said valve shaft the sides of said substantially equilateral triangular in shape stop will abut against the three stop screws of said mounting ring, thereby preventing the valve shaft from rotating further preferably in at least one direction, such that the resultant force balance on said stop is zero and there is no side load on said shaft tending to deteriorate the life of the bearing and/or the seals.

In still yet another preferred embodiment of the present invention, there is provided a travel stop for limiting the rotational travel of an accessible valve shaft of an actuator in two directions comprising;

at least one stop being of substantially an equilateral triangle in shape having three equal sides connectible through its centre to the accessible shaft, from said actuator, two mounting rings mountable on said actuator, each ring having three substantially equidistantly spaced apart adjustable stop screws mounted thereto for cooperating with the sides of said triangular stop, where one ring is mounted on top of the other ring such that the positioning of the adjustable stop screws of one ring, along with the positioning of the adjustable stop screws of the other ring form a substantially 60° angle in relation to one another with their vertices lying on said rings, wherein after a predetermined degree of rotational travel in one direction of said accessible shaft, the sides of the at least one triangular stop will abut against the three stop screws of one mounting ring thereby preventing the valve shaft from rotating further in one direction, and after a predetermined degree of rotational travel in the other direction of said valve shaft, the sides of the at least one triangular stop will abut against the three stop screws of the other mounting ring thereby preventing the valve shaft from rotating further in the other direction, such that the resultant force balance on said at least one travel stop is zero and there is no side load on said shaft tending to deteriorate the life of the bearing and/or the seals.

In still yet another preferred embodiment of the present invention, there is provided a travel stop for limiting the rotational travel of an accessible valve shaft of an actuator in two directions comprising;

at least one stop being of substantially an equilateral triangle in shape having three equal sides connected through its centre to the accessible shaft, from said actuator, two mounting rings mounted on said actuator, each ring having three substantially equidistantly spaced apart adjustable stop screws mounted thereto for cooperating with the sides of said triangular stop, where one ring is mounted on top of the other ring such that the positioning of the adjustable stop screws of one ring, along with positioning of the adjustable stop screws of the other ring form a substantially 60° angle in relation to one another with their vertices lying on said rings, wherein after a predetermined degree of rotational travel in one direction of said accessible shaft, the sides of the at least one triangular stop will abut against the three stop screws of one mounting ring thereby preventing the valve shaft from rotating further in one direction, and after a predetermined degree of rotational travel in the other direction of said valve shaft, the sides of the at least one triangular stop will abut against the three stop screws of the other mounting ring thereby preventing the valve shaft from rotating further in the other direction, such that the resultant force balance on said at least one travel stop is zero and there is no side load on said shaft tending to deteriorate the life of the bearing and/or the seals.

In still yet another preferred embodiment of the present invention, there is provided a rotation limiter for use with an accessible shaft of a valve actuator comprising first means disposed with the accessible shaft and second means disposed with the actuator and positioned to limit the motion of the first means in use, wherein upon rotation of the accessible shaft, engagement of the first means with the second means results in a sum of the created moments and forces by such engagement on the shaft as substantially nil.

BRIEF DESCRIPTION OF THE DRAWINGS

The invention will now be illustrated with respect to the following drawings illustrating embodiments of the invention in which:

FIG. 2 is a top view of the present invention is a preferred embodiment.

FIG. 3 is a top view of the present invention is a preferred embodiment when the flat stop is abutted against the stop screws.

DETAILED DESCRIPTION OF PREFERRED EMBODIMENTS OF THE INVENTION

Figure 1:
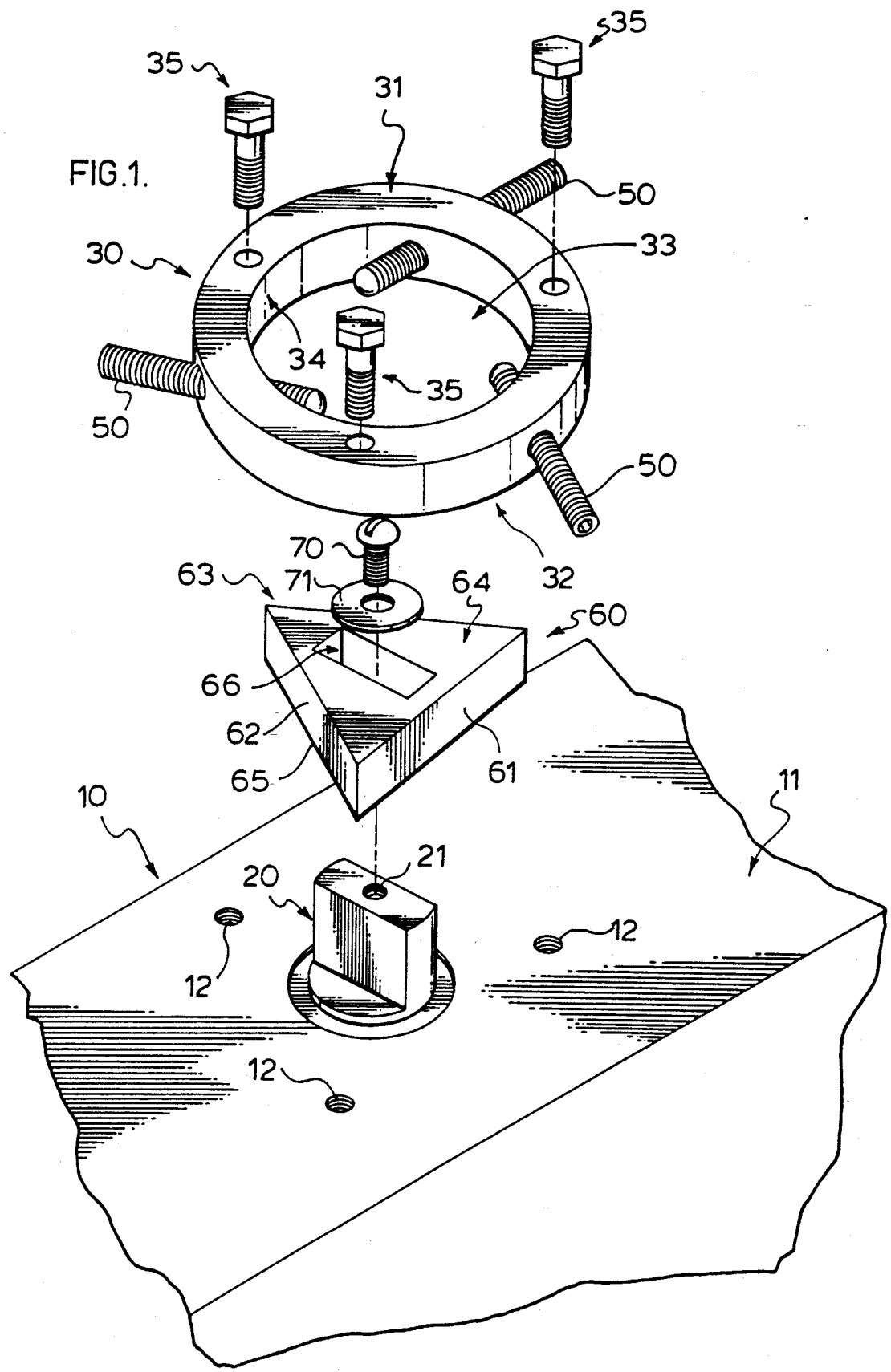
FIG. 1 is an exploded perspective view showing the parts of the invention unassembled.
Figure 4:
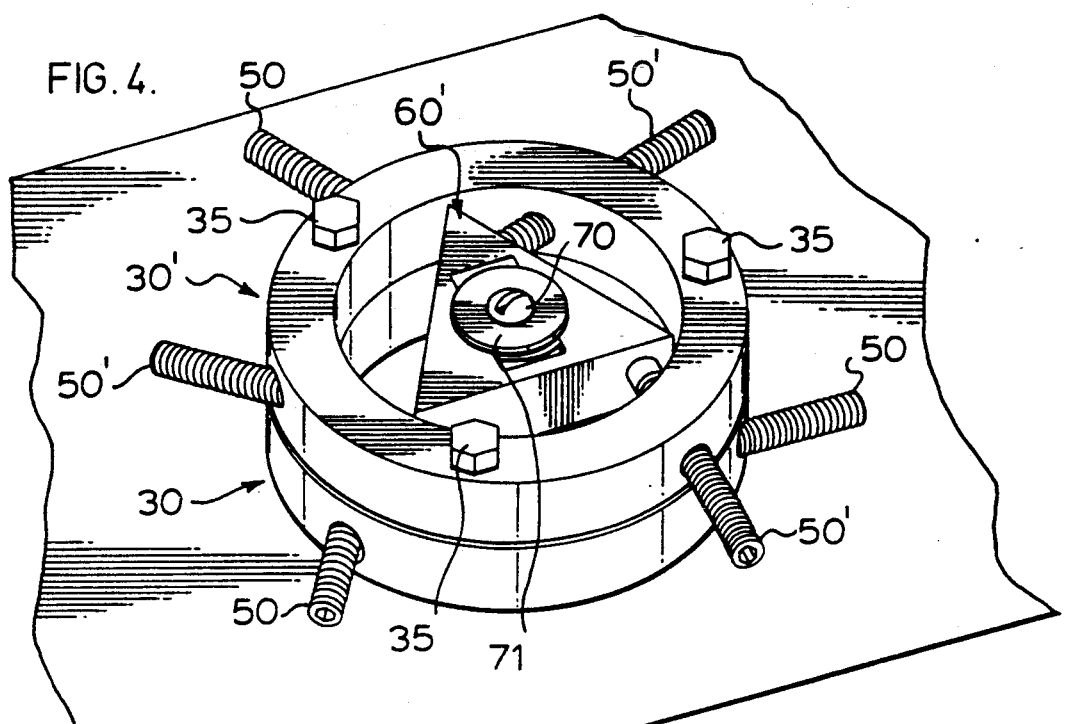
FIG. 4 is a perspective view of the present invention when the rotation is limited in two directions.
Figure 5:
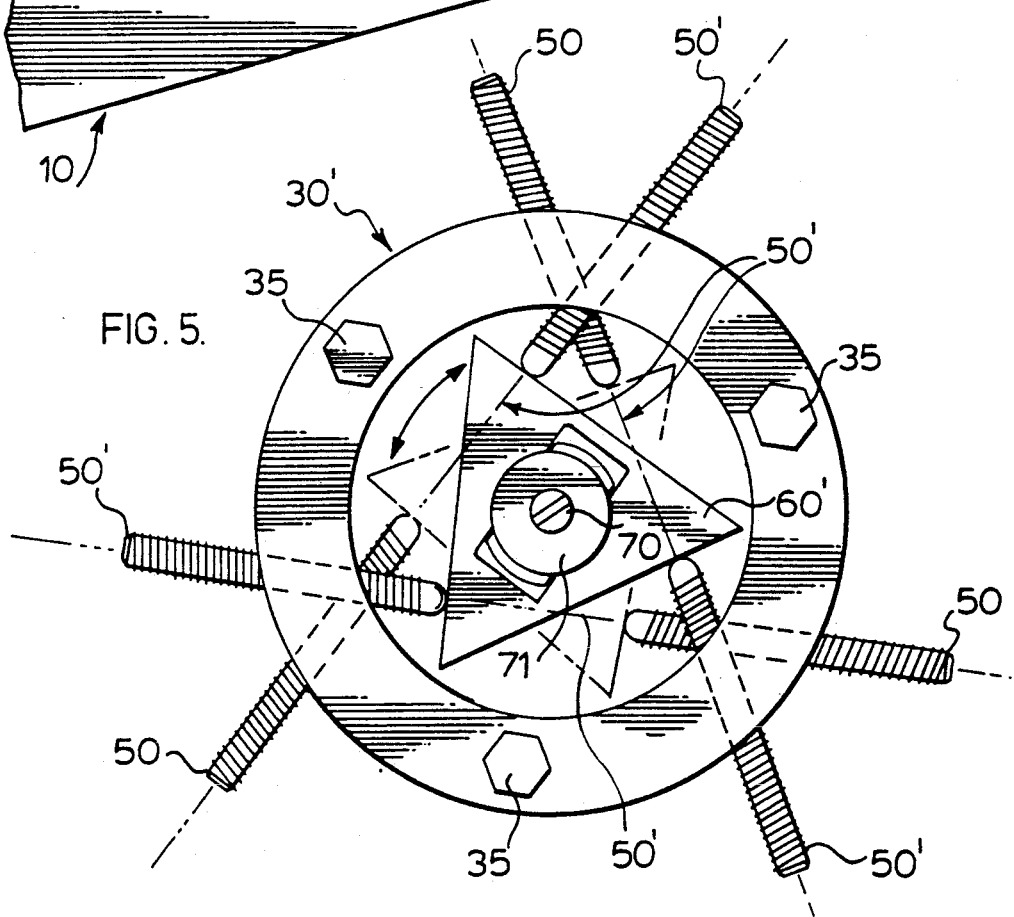
FIG. 5 is a top view of FIG. 4 showing the rotation limits of the invention.
Figure 6:
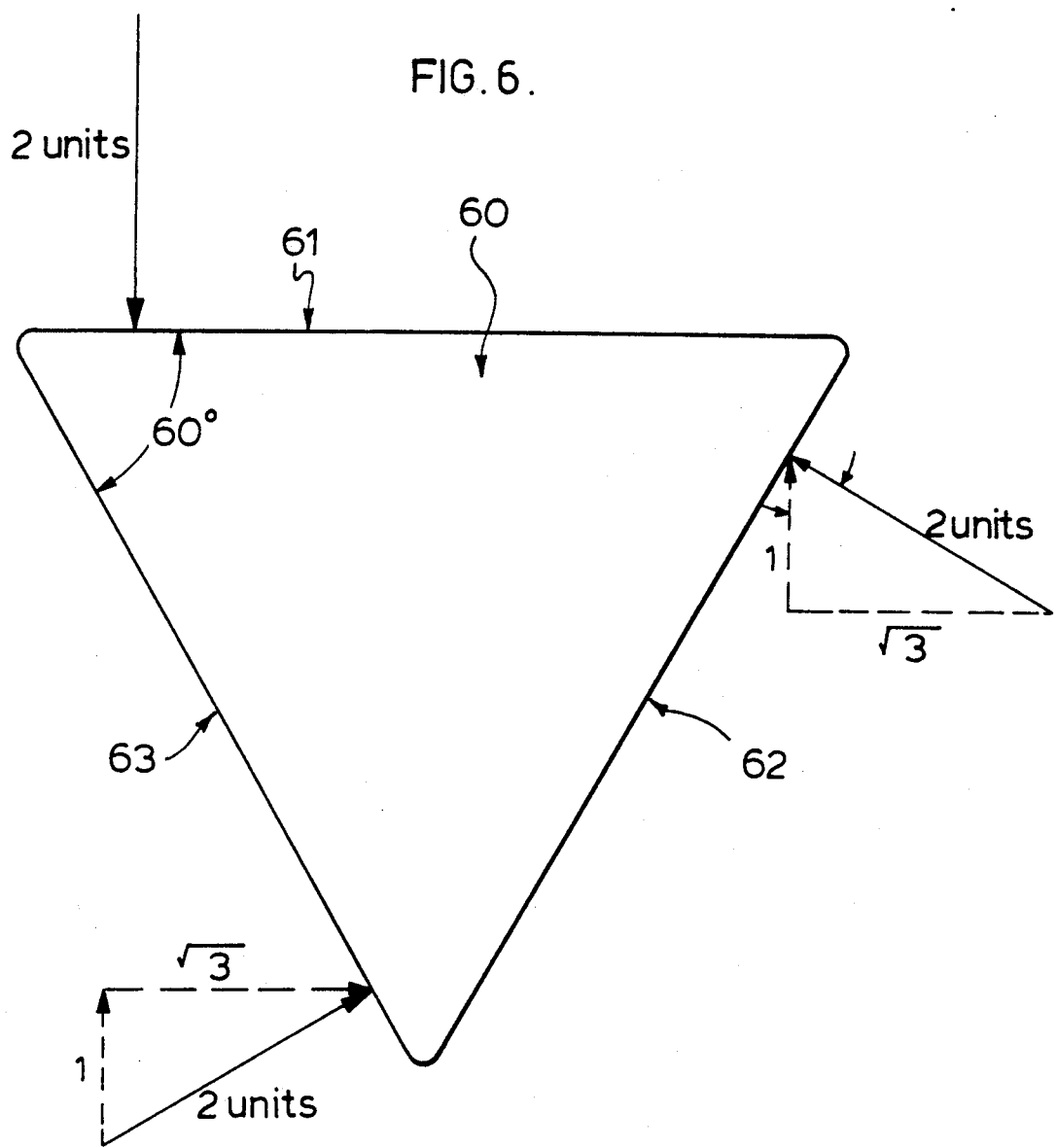
FIG. 6 is a force summary diagram of the invention.

Referring now to FIG. 1, there is seen a pneumatic quarter turn valve actuator 10 having a shaft 20 running through the actuator and extending from the top 11 thereof. On the top 11 of the actuator 10, there is seen a circular stop plate 30, preferably made of low carbon steel or stainless steel or the like, having a top 31, bottom 32, and side 33 (outside diameter), further having a circular aperture 33 defined through said top 31 and bottom 32, further defining a second side 34 (inside diameter), mounted onto the top 11 of said actuator 10 by three bolts 35. The existing bolt holes 12 of the actuator have been used to mount the stop plate 30 thereon. Running transversely through the sides 33 and 34 of the stop plate 30 are three equidistantly spaced apart threaded bores 40, where each bore has threaded therein, a longitudinal threaded stop screw 50, where said position of said stop screw 50 may be adjusted by rotating each stop screw 50 within the threaded bore 40 to the desired location. The three stop screws 50 when connected to each other from common end to common end, form an outline of an equilateral triangle as best seen in FIG. 5 as dotted line number 50'. Connected to the shaft 20 end at the top 11 of actuator 10 is a flat stop 60, preferably made of low carbon steel or stainless steel, or ductile iron in the shape of an equilateral triangle having three sides 61, 62, 63 and a top 64 and a bottom 65. In the centre of the flat stop 60, there is a aperture 66 running through the top 64 and bottom 65 of said flat stop 60 which is slightly larger that the dimensions of the shaft 20 end, so that the flat stop 60 may fit snugly over the shaft 20 end. The flat stop 60 is further connected to the shaft end 20 by a threaded bolt 70 and a washer 71, which is threaded in the threaded bore 21 of the shaft 20 end. As can be seen, the flat equilateral triangular stop 60, specifically the area proximate the vertices formed by the sides 61-62, 62-63, 63-61, are now in line with the stop screws 50 as best seen in FIGS. 2 and 3. When a signal is sent to the actuator 10, the pressure which enters one side of the actuator 10 causes the shaft 20 to rotate in one direction as best seen in FIG. 3, the flat stop 60, connected thereto in turn rotates with the shaft 20, and depending on the amount the stop screws 50 are adjusted to on the stop plate 30, after that predetermined degree of rotation, each of the sides 61, 62, and 63, of the flat stop 60 will abut against one of the stop screws 50 on the stop plate 30 thereby preventing the shaft 20 from rotating further in that direction. Referring now to FIGS. 4 and 5, there is shown the instant invention when used to limit the travel of a valve actuator 10 in two directions, i.e., bidirectional as opposed to unidirectional as exemplified by the above-mentioned detailed description. In order to obtain bidirectional control of the valve actuator 10, a second stop plate 30' identical to the stop plate 30 as mentioned above, is placed directly overtop the first stop plate 30 in an inverted manner and rotated substantially 90 degrees in respect of the stop screws 50, 50' of each stop plate 30, 30' such that the stop screws 50' of one plate 30' together with the stop screws 50 of the other plate 30 each form a substantially 60 degree angle. Also, the flat stop 60 should be thick enough so that the sides will contact the stop screws 50' of the upper plate 30' and the stop screws 50 of the lower plate 30. In this instance, two substantially equilateral triangular flat stops 60, 60' are used, one placed directly on top of the other, such that both are secured to the shaft 20 end by a bolt 70 and a washer 71 threaded into the threaded bore 21 of the shaft 20. Thus, when pressure is directed to the actuator 10 in one direction, the shaft 20 will rotate until the flat stops 60, 60', particularly the sides thereof abut against the stop screws 50 of the lower stop plate 30. Similarly, when pressure is directed to the actuator 10 in another direction, the shaft 20 will rotate in the other direction until the second flat stop 60', particularly the sides thereof, abut against the stop screws 50' on the second stop plate 30'. Depending on the length and degree the stop screws 50, 50' are threaded into the threaded bores 40, 40' of the stop plates 30, 30', the valve actuator 10 can be limited to zero degree rotation in one or both directions, or can be limited by the set limits of the actuator 10 itself, if the stop screws 50, 50' do not protrude the side of the stop plates 30, 30'. Due to the equilateral triangular configuration of the flat stops 60, 60' and the stop screws 50, 50', the resultant forces on the shaft 20 is zero, and thus there is no side load on the shaft 20 therefore reducing the possibility of wear of the seals, and any other damage to the shaft 20 or actuator 10 itself. To exemplify the above, referring to FIG. 6 there is shown a force balance summary of an equilateral triangle in shape flat stop 60. As seen, if for example, the force on each of the sides 61, 62, and 63 of the flat stop 60 is 2 units, the sum of forces along the x-axis is $\Sigma x = 0 + \sqrt{3} - \sqrt{3} = 0$. Similarly, the sum of forces along the y-axis is $\Sigma y = -2 + 1 + 1 = 0$. Thus, as can be seen there will be no side load on the shaft to affect the bearings or seals on the shaft.

The following are results of several tests performed on the present invention to determine any wear or damage to the actuator itself or the bearings and seals.

EXAMPLE 1

The invention was mounted on a pneumatic actuator with a 1000 in. lb. torque rating, and was subjected to 10,000 cycles on the actuator. The actuator was disassembled and inspected for wear. The results were that no uneven wear was found inside the actuator or at the shaft seals and bearings. The actuator was then subjected to an 80 PSI Shell Test and was found to hold tight at the shaft seals. The unit was reassembled with "Loctite" on the stop screws and then cycled for 50,000 cycles. After this cycle run, there was no structural distortion of the invention, and inspection of the bearings and shaft seals revealed no wear, and the bearings were not affected by any side loads from the stop mechanism.

EXAMPLE 2

A second limit stop was tested on a pneumatic actuator with a 3000 in. lb. torque rating and then subjected to 50,000 cycles on the actuator. After this test, the limit stop and the actuator were inspected and there was no uneven wear or leaks inside the actuator, and there was no structural distortion of the travel stop found, and the shaft bearings and seals exhibited no wear. As many changes can be made to the preferred embodiments of the invention without departing from the scope of the invention; it is intended that all material contained herein be interpreted as illustrative of the invention and not in a limiting sense.

The embodiments of the invention in which an exclusive property or privilege is claimed are as follows:

1. An apparatus for limiting the rotational travel of a shaft of a valve actuator comprising;
    shaft engaging means connected to a shaft accessible from said valve actuator so as to rotate when the accessible shaft is free to do so, said shaft engaging means further comprising at least three substantially equidistantly spaced apart detents,
    mounting means coupled to said actuator, said mounting means having stop means disposed therewith, wherein when said shaft rotates said at least three substantially equidistantly spaced apart detents of said shaft engaging means cooperates with said stop means, such that after a predetermined degree of rotational travel of the shaft, said at least three substantially equidistantly spaced apart detents of said shaft engaging means in cooperation with said stop means limits the rotational travel of said shaft of said valve actuator, the resultant force balance on said shaft being substantially zero.

2. An apparatus for limiting the rotational travel of an accessible shaft of a valve actuator comprising;
    shaft engaging means, having at least three substantially equidistantly spaced apart detent means disposed therewith and connectible to a shaft accessible from said valve actuator
    mounting means for coupling to said actuator, said mounting means further comprising stop means for cooperating with said at least three substantially equidistantly spaced apart detent means, wherein when said shaft engaging means rotates with said shaft, said at least three substantially equidistantly spaced apart detent means thereof cooperates with said stop means, such that after a predetermined degree of rotational travel of the shaft, said at least three substantially equidistantly spaced apart detent means of the shaft engaging means in cooperation with said stop means of said mounting means limits the rotational travel of said shaft of said valve actuator, such that the resultant force balance on said shaft engaging means and thus the shaft is substantially zero.

3. An apparatus for limiting the rotational travel of a shaft of a valve actuator comprising;
    shaft engaging means, having at least three substantially equidistantly spaced apart detent means disposed therewith, connected to a shaft accessible from said valve actuator,
    stop means coupled to said actuator,
    wherein when said shaft engaging means rotates with said shaft, said at least three substantially equidistantly spaced apart detent means cooperates with said stop means, such that after a predetermined degree of rotational travel of the shaft, said at least three substantially equidistantly spaced apart detent means in cooperation with said stop means limits the rotational travel of said shaft of said valve actuator, such that the resultant force balance on said shaft engaging means and thus the shaft is substantially zero.

4. An apparatus for limiting the rotational travel of a shaft of a valve actuator comprising;
    shaft engaging means, having at least three substantially equidistantly spaced apart detent means disposed therewith, connectible to a shaft accessible from said valve actuator
    stop means for coupling to said actuator,
    wherein when said shaft engaging means rotates with said shaft, said at least three substantially equidistantly spaced apart detent means cooperates with said stop means, such that after a predetermined degree of rotational travel of the shaft, said at least three substantially equidistantly spaced apart detent means in cooperation with said stop means limits the rotational travel of said valve actuator, such that the resultant force balance on said rotating means and thus the shaft is substantially zero.

5. A travel stop for limiting the rotational travel of a valve shaft preferably in at least one direction of a actuator comprising;
    a stop being substantially an equilateral triangle in shape and connectible to a shaft, accessible from said actuator,
    a mounting ring for mounting with said actuator having three substantially equidistantly spaced apart adjustable stop screws thereon for cooperating with said stop being substantially an equilateral triangular in shape, such that after a predetermined degree of rotational travel in at least one direction of said valve shaft said triangular stop will abut against the stop screws of said mounting ring, thereby preventing the valve shaft from rotating further in at least one direction, such that the resultant force balance on said stop is substantially zero and there is no side load on said shaft tending to deteriorate the life of said shaft.

6. A travel stop for limiting the rotational travel of a valve shaft preferably in at least one direction of an actuator comprising;

a stop being substantially an equilateral triangle in shape having three equal sides connected substantially through its centre to a shaft, accessible from said actuator, a mounting ring mounted on said actuator having three substantially equidistantly spaced apart adjustable stop screws mounted therewith for cooperating with the sides of said substantially equilateral triangular in shape stop in use, such that after a predetermined degree of rotational travel in at least one direction of said valve shaft the sides of said substantially equilateral triangular in shape stop will abut against the three stop screws of said mounting ring, thereby preventing the valve shaft from rotating further in at least one direction, such that the resultant force balance on said stop is zero and there is no side load on said shaft tending to deteriorate the life of said shaft.

7. A travel stop for limiting the rotational travel of an accessible valve shaft of an actuator in two directions comprising;

at least one stop being of substantially an equilateral triangle in shape having three equal sides connectible through its centre to the accessible shaft, from said actuator, two mounting rings mountable on said actuator, each ring having three substantially equidistantly spaced apart adjustable stop screws mounted thereto for cooperating with the sides of said triangular stop, where one ring is mounted on top of the other ring such that the positioning of the adjustable stop screws of one ring, along with the positioning of the adjustable stop screws of the other ring form a substantially 60° angle in relation to one another with their vertices lying on said rings, wherein after a predetermined degree of rotational travel in one direction of said accessible shaft, the sides of the at least one triangular stop will abut against the three stop screws of one mounting ring thereby preventing the valve shaft from rotating further in one direction, and after a predetermined degree of rotational travel in the other direction of said valve shaft, the sides of the at least one triangular stop will abut against the three stop screws of the other mounting ring thereby preventing the valve shaft from rotating further in the other direction, such that the resultant force balance on said at least one travel stop is zero and there is no side load on said shaft tending to deteriorate the life of said shaft.

8. A travel stop for limiting the rotational travel of an accessible valve shaft of an actuator in two directions comprising;

at least one stop being of substantially an equilateral triangle in shape having three equal sides connected through its centre to the accessible shaft, from said actuator, two mounting rings mounted on said actuator, each ring having three substantially equidistantly spaced apart adjustable stop screws mounted thereto for cooperating with the sides of said triangular stop, where one ring is mounted on top of the other ring such that the positioning of the adjustable stop screws of one ring, along with positioning of the adjustable stop screws of the other ring form a substantially 60° angle in relation to one another with their vertices lying on said rings, wherein after a predetermined degree of rotational travel in one direction of said accessible shaft, the sides of the at least one triangular stop will abut against the three stop screws of one mounting ring thereby preventing the valve shaft from rotating further in one direction, and after a predetermined degree of rotational travel in the other direction of said valve shaft, the sides of the at least one triangular stop will abut against the three stop screws of the other mounting ring thereby preventing the valve shaft from rotating further in the other direction, such that the resultant force balance on said at least one travel stop is zero and there is no side load on said shaft tending to deteriorate the life of said shaft.

9. A rotation limiter for use with an accessible shaft of a valve actuator comprising first means having at least three detent means, said first means disposed with the accessible shaft and second means having at least three detent means, said second means disposed with the actuator and positioned to limit the motion of the first means in use, wherein upon rotation of the accessible shaft, engagement of the at least three detent means of the first means with the at least three detent means of the second means results in a sum of the created moments and forces by such engagement on the shaft as substantially nil.

10. The apparatus of claim 1 or 2 where said mounting means is coupled proximate said shaft.

11. The apparatus of claim 1, 2, 3 or 4 where said stop means are adjustable.

12. The apparatus of claim 1, 2, 3 or 4 where said shaft engaging means is substantially an equilateral triangle.

13. The apparatus of claim 11 where said adjustable stop means comprises at least three adjustable stop screws.

14. The apparatus of claim 1, 2, 3 or 4 where said apparatus limits the travel of said shaft in one direction.

15. The apparatus of claim 1, 2, 3 or 4 where said apparatus limits the travel of said shaft in two directions.

16. The apparatus of claim 13 where said at least three adjustable stop screws are aligned substantially equidistantly on said mounting means forming an outline of an substantially equilateral triangle.

* * * * *